United States Patent [19]

Ando et al.

[11] 4,289,462

[45] Sep. 15, 1981

[54] APPARATUS FOR MANUFACTURING VITREOUS BLAST FURNACE SLAG

[75] Inventors: Ryo Ando; Kazuyoshi Sato, both of Yokohama; Akira Honda, Kamakura, all of Japan

[73] Assignee: Nippon Kokan Kabushiki Kaisha, Tokyo, Japan

[21] Appl. No.: 77,044

[22] Filed: Sep. 19, 1979

[30] Foreign Application Priority Data

Oct. 16, 1978 [JP] Japan .............................. 53-126098

[51] Int. Cl.³ .................................................. B22C 5/08
[52] U.S. Cl. ...................................... 425/8; 425/115; 425/134; 425/223; 425/274; 425/424; 425/464
[58] Field of Search .............. 425/8, 115, 134, 223, 425/274, 424, 464

[56] References Cited

U.S. PATENT DOCUMENTS

| | | | |
|---|---|---|---|
| 1,843,716 | 2/1932 | Giller | 65/20 |
| 1,888,943 | 11/1932 | Von Reiche | 65/141 |
| 2,324,938 | 7/1943 | Love | 75/24 |

FOREIGN PATENT DOCUMENTS

| | | |
|---|---|---|
| 38-17829 | 9/1963 | Japan . |
| 52-30149 | 8/1977 | Japan . |
| 53-19991 | 2/1978 | Japan . |
| 53-13321 | 5/1978 | Japan . |

*Primary Examiner*—John Parrish
*Attorney, Agent, or Firm*—Frishauf, Holtz, Goodman and Woodward

[57] ABSTRACT

An apparatus for manufacturing a vitreous blast furnace slag, comprises a rotary drum having a circular barrel formed by endlessly connecting a plurality of rectangular cooling metal members, each of said cooling metal members having a plurality of narrow and deep cooling grooves on the outer surface thereof for rapidly cooling and solidifying a molten blast furnace slag into a vitreous blast furnace slag; a driving mechanism for rotating said rotary drum; a molten blast furnace slag feeder arranged above said rotary drum for pouring a molten blast furnace slag into said cooling grooves; a stripper stationarily arranged at a prescribed position adjacent to the inner surface of the barrel of said rotary drum, for taking out a cooled and solidified vitreous blast furnace slag in said cooling grooves; and, a cooling tank containing cooling water, arranged below said rotary drum so that the lower portion of the barrel of said rotary drum is immersed in the cooling water for cooling said cooling metal members heated by the high-temperature molten blast furnace slag poured into said cooling grooves.

7 Claims, 4 Drawing Figures

APPARATUS FOR MANUFACTURING VITREOUS BLAST FURNACE SLAG

FIELD OF THE INVENTION

The present invention relates to an apparatus for manufacturing a vitreous blast furnace slag substantially free of water with a very low porosity and a large internal strain, which gives a high cooling rate sufficient to substantially completely vitrify a molten blast furnace slag.

BACKGROUND OF THE INVENTION

A water-granulated blast furnace slag (hereinafter referred to as a "water-granulated slag") used as a raw material for cement has conventionally been manufactured by spraying pressurized cooling water onto a molten slag discharged from a blast furnace. Since the molten blast furnace slag is cooled and solidified through contact with the cooling water, the water-granulated slag thus obtained is vitrified. A water-granulated slag is usually applied as follows:

(a) as part of a raw material for a Portland cement clinker;

(b) to be added with a Portland cement; and (c) as a raw material for a blast furnace cement.

However, because a water-granulated slag comes into direct contact with a cooling water in the course of manufacturing, it usually contains about 15 wt.% water. To apply it for any of the above-mentioned uses (a) to (c), therefore, it is necessary to dry the water-granulated slag in advance. This drying requires about 17 liters of heavy oil per ton of water-granulated slag, and in addition, transportation cost for the unnecessary water content is required when transporting the water-granulated slag before drying. For the uses (b) and (c) above, furthermore, it is necessary to finely pulverize the water-granulated slag previously until the specific surface area value based on the Blaine-air-permeability method (hereinafter referred to as the "Blaine fineness") reaches about 4,000 cm$^2$/g, thus requiring about 100 KWH electric power per ton of water-granulated slag. During the manufacture of the water-granulated slag, contact with the cooling water leads to the production of such noxious gases as hydrogen sulfide, resulting in worsening working environments, and moreover, useful soluble substances contained in the water-granulated slag such as lime, silica and alumina are lost by dissolution into the cooling water.

With these facts in view, the following treating process and treating apparatus of a molten blast furnace slag have been proposed.

(1) An apparatus for granulating a molten material such as a molten steel or a molten slag, disclosed in Japanese Patent Publication No. 30,149/77 dated Aug. 5, 1977, which comprises:

feeding a molten material such as a molten steel or a molten slag onto a rotary disk in rotation; granulating said molten material by causing said molten material to scatter under the effect of centrifugal force produced by the rotation of said disk; covering the periphery of said disk with a frustoconical casing flaring downwardly; forming a film of cooling water flowing downwardly along the inner surface of said casing; and, cooling and solidifying said granulated molten material by the contact with said film of flowing cooling water (hereinafter referred to as the "prior art (1)").

(2) A method for treating a molten slag, disclosed in Japanese Patent Publication No. 13,323/78 dated May 9, 1978, which comprises:

feeding a molten slag into a rotating rotary drum inclined by 2° to 20° relative to the horizontal line from an inlet on the higher side thereof, while cooling the barrel of said drum by spraying cooling water onto the outer surface of said drum; cooling and solidifying said molten slag by the contact with the inner surface of said drum, and at the same time, crushing said solidified slag by the rotation of said drum; and, discharging said crushed slag from an outlet on the lower side of said drum (hereinafter referred to as the "prior art (2)").

(3) An apparatus for granulating a molten slag, disclosed in Japanese Patent Provisional Publication No. 19,991/78 dated Feb. 23, 1978, which comprises:

feeding a molten slag onto the outer surface of a rotating rotary drum; granulating said molten slag by causing same to scatter in front of said drum under the effect of centrifugal force produced by the rotation of said drum; and, cooling and solidifying said granulated molten slag by a cooling system installed within the scattering area of said granulated molten slag (hereinafter referred to as the "prior art (3)")

(4) A method for manufacturing a material for blast furnace cement, disclosed in Japanese Patent Publication No. 17,829/63 dated Sept. 11, 1963, which comprises:

vitrifying a molten blast furnace slag by granulating, while cooling and solidifying, said molten blast furnace slag by blowing the molten blast furnace slag with a pressurized fluid such as a pressurized air and a pressurized steam, or by causing the molten blast furnace slag fed onto a rotating rotary disk to scatter under the effect of centrifugal force produced by the rotation of said disk; and, finely pulverizing said vitrified granulated blast furnace slag (hereinafter referred to as the "prior art (4)").

However, in any of the above-described prior arts (1) to (4), partial crystallization of molten blast furnace slag is inevitable, because it is impossible to obtain a high cooling rate sufficient to completely vitrify the molten blast furnace slag. In the prior arts (1) and (3), furthermore, problems similar to those in the water-granulated slag mentioned above are encountered, since water is still employed as the cooling medium.

SUMMARY OF THE INVENTION

A principal object of the present invention is therefore to provide an apparatus for manufacturing a vitreous blast furnace slag, which has a high cooling rate sufficient to substantially completely vitrifying a molten blast furnace slag.

An object of the present invention is to provide an apparatus for manufacturing a vitreous blast furnace slag substantially free of water with a very low porosity and a large internal strain.

Another object of the present invention is to provide an apparatus for manufacturing a vitreous blast furnace slag excellent in fine-pulverability.

Further another object of the present invention is to provide an apparatus for manufacturing a vitreous blast furnace slag adapted to serve as a raw material for a cement or for a calcium silicate fertilizer.

In accordance with one of the features of the present invention, there is provided an apparatus for manufacturing a vitreous blast furnace slag, which comprises:

a rotary drum having a substantially circular barrel formed by endlessly connecting a plurality of rectangular cooling metal members, each of said plurality of cooling metal members having a plurality of narrow and deep cooling grooves on the outer surface thereof with the longitudinal direction of the cooling grooves being substantially in parallel with the rotating direction of said rotary drum, and each of said plurality of cooling grooves comprising an outwardly flaring inlet section for introducing a molten blast furnace slag and an inwardly narrowing cooling section, following said inlet section, for rapidly cooling and solidifying the molten blast furnace slag into a vitreous blast furnace slag;

a driving mechanism, connected to the center axle of said rotary drum, for rotating said rotary drum;

a molten blast furnace slag feeder including a slag container, arranged above said rotary drum, said molten blast furnace slag feeder being adapted to receive a molten blast furnace slag discharged from a blast furnace into said slag container and pour said molten blast furnace slag thus received into said plurality of cooling grooves of said cooling metal member reaching about the highest position of the barrel of said rotary drum during rotation of said rotary drum;

a stripper stationarily arranged at a prescribed position in said rotary drum adjacent to the inner surface of the barrel of said rotary drum, said stripper being adapted to take out a cooled and solidified vitreous blast furnace slag in said plurality of cooling grooves of said cooling metal member; and, a cooling tank containing cooling water, arranged below said rotary drum so that the lower portion of the barrel of said rotary drum is immersed in the cooling water, said cooling tank being adapted to cause said plurality of cooling metal members forming the barrel of said rotary drum to successively pass through the cooling water in said cooling tank along with the rotation of said rotary drum, thereby cooling said cooling metal members heated by the high-temperature molten blast furnace slag poured into said cooling grooves.

DETAILED DESCRIPTION OF PREFERRED EMBODIMENTS

With a view to solving the problems mentioned above in the manufacture of the conventional water-granulated blast furnace slag and the other conventional granulated blast furnace slags, we carried out extensive studies, and obtained the following findings:

(1) Rapid cooling of a molten blast furnace slag by the direct contact with cooling water as in the manufacture of the conventional water-granulated blast furnace slag forms a cause of a high water content of the granulated blast furnace slag thus obtained.

(2) Allowing a molten blast furnace slag to expand without restriction in the cooling step as in the manufacture of the conventional granulated blast furnace slag results in a porous granulated blast furnace slag, and hence forms a cause of a higher water content. Furthermore, unless expansion of the molten blast furnace slag in the cooling step is restricted, the small internal strain of the granulated blast furnace slag thus obtained requires a large quantity of electric power for fine pulverizing.

(3) In a method in which a molten blast furnace slag is granulated, cooled and solidified by bringing the molten blast furnace slag into contact with the inner surface of a rotary drum as in the aforementioned prior art (2), or by causing the molten blast furnace slag to scatter under the effect of centrifugal force produced by the rotation of a rotary disk or a rotary drum as in the aforementioned prior arts (1), (3) and (4), it is impossible to obtain a high cooling rate sufficient to substantially completely vitrify the molten blast furnace slag.

(4) A high cooling rate sufficient to substantially completely vitrify a molten blast furnace slag can be obtained if the molten blast furnace slag is rapidly cooled by bringing the molten blast furnace slag into direct contact with the surface of cooling metal members made of a metal having a high thermal conductivity such as copper, and the quantity of molten blast furnace slag to be cooled is always limited to below a certain prescribed quantity. In this case, furthermore, it is possible to manufacture a vitreous blast furnace slag substantially free of water since it is not necessary to use cooling water. This not only eliminates the necessity of drying cost of the product, but also minimizes the required transportation cost because the product is always transported in a state free of water.

(5) When a plurality of narrow and deep cooling grooves of prescribed dimensions are formed on the surface of the aforementioned cooling metal members and a molten blast furnace slag is poured into said cooling grooves, it is possible to always limit to below a certain quantity the quantity of molten blast furnace slag to be cooled per unit area of the cooling metal member, hence of the cooling groove, and thus to obtain a high cooling rate sufficient to substantially completely vitrify the molten blast furnace slag. In addition, because expansion of the molten blast furnace slag in the cooling step in this case is restricted by the two opposite cooling surfaces of the cooling grooves, it is possible to manufacture a vitreous blast furnace slag with a very low porosity and a large internal strain. The vitreous blast furnace slag thus obtained is therefore not only substantially free of water but also excellent in fine-pulverability.

The present invention was developed based on the findings described in (1) to (5) above, and the apparatus for manufacturing a vitreous blast furnace slag of the present invention comprises:

a rotary drum having a substantially circular barrel formed by endlessly connecting a plurality of rectangular cooling metal members, each of said plurality of cooling metal member having a plurality of narrow and deep cooling grooves on the outer surface thereof with the longitudinal direction substantially in parallel with the rotating direction of said rotary drum, and each of said plurality of cooling grooves comprising an outwardly flaring inlet section for introducing a molten blast furnace slag and an inwardly narrowing cooling section, following said inlet section, for rapidly cooling and solidifying the molten blast furnace slag into a vitreous blast furnace slag;

a driving mechanism, connected to the center axle of said rotary drum, for rotating said rotary drum;

a molten blast furnace slag feeder including a slag container, arranged above said rotary drum, said molten blast furnace slag feeder being adapted to receive a molten blast furnace slag discharged from a blast furnace into said slag container and pour said molten blast furnace slag thus received into said plurality of cooling grooves of said cooling metal member reaching about the highest position of the barrel of said rotary drum along with the rotation of said rotary drum;

a stripper stationarily arranged at a prescribed position in said rotary drum adjacent to the inner surface of the barrel of said rotary drum, said stripper being adapted to take out a cooled and solidified vitreous blast furnace slag in said plurality of cooling grooves of said cooling metal member; and, a cooling tank containing cooling water, arranged below said rotary drum so that the lower portion of the barrel of said rotary drum is immersed in the cooling water, said cooling tank being adapted to cause said plurality of cooling metal members forming the barrel of said rotary drum to successively pass through the cooling water in said cooling tank along with the rotation of said rotary drum, thereby cooling said cooling metal members heated by the high-temperature molten blast furnace slag poured into said cooling grooves.

Now, the apparatus for manufacturing a vitreous blast furnace slag of the present invention is described in more detail with reference to the drawings.

Figure 1:
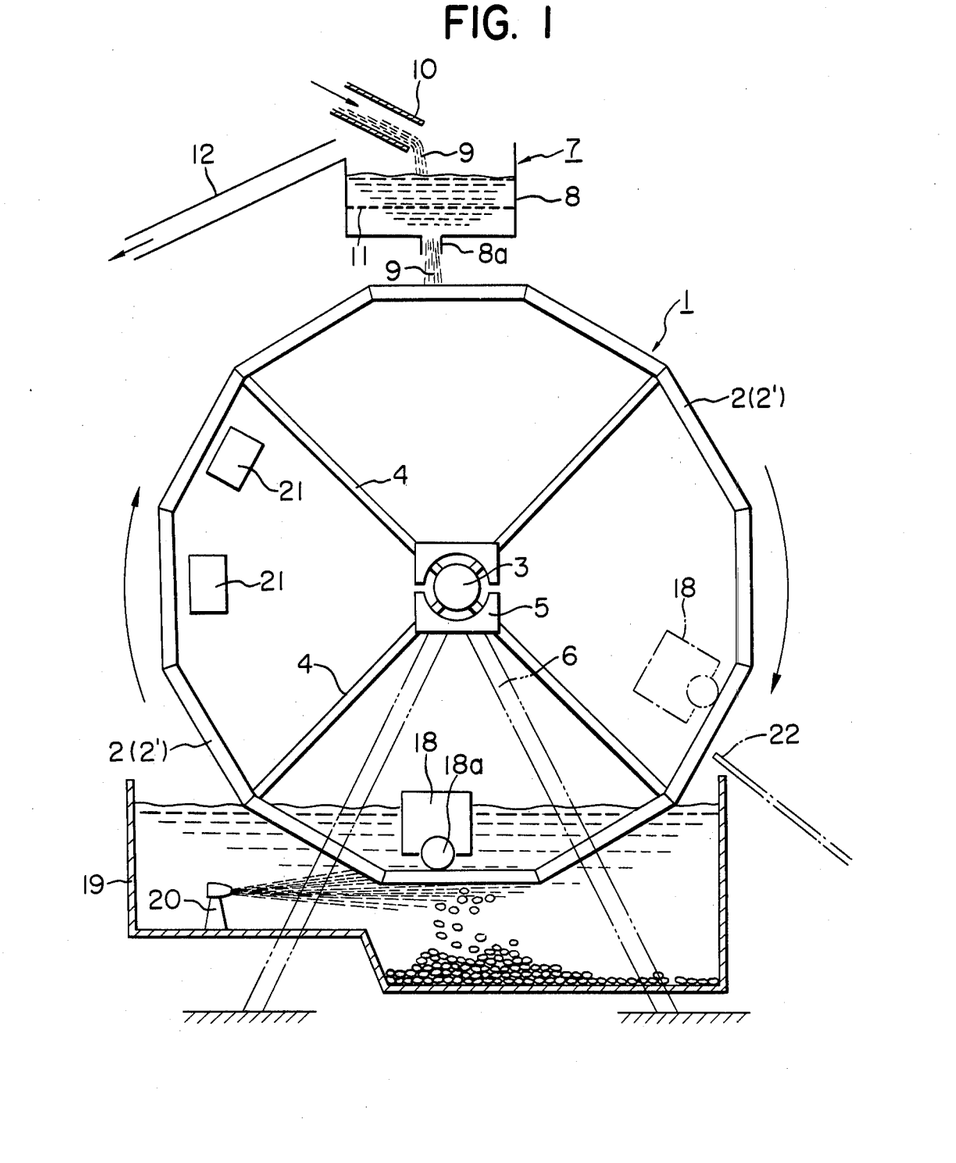
FIG. 1 is a schematic sectional view illustrating an embodiment of the apparatus for manufacturing a vitreous blast furnace slag of the present invention.

FIG. 1 is a schematic sectional view illustrating an embodiment of the apparatus for manufacturing a vitreous blast furnace slag of the present invention. In FIG. 1, 1 is a rotary drum; 2 are a plurality of rectangular cooling metal members forming the barrel of the rotary drum 1; 3 is a center axle of the rotary drum 1; 4 are a plurality of spokes connecting the barrel of the rotary drum 1 and the center axle 3; 5 are a pair of bearings supporting the both ends of the center axle 3; and, 6 are a pair of supporting legs supporting the rotary drum 1.

As shown in FIG. 1, the plurality of cooling metal members 2 are mutually endlessly connected to form the barrel of the rotary drum 1. In FIG. 1, only four spokes are shown to simplify the drawing. However, in order to form a stout barrel of the rotary drum 1, it is desirable to use spokes 4 in a number at least equal to that of the cooling metal members 2. Because of the necessity to stationarily arrange a stripper and a restorer described later at prescribed positions in the barrel of the rotary drum 1, the plurality of spokes 4 are installed only on one side of the barrel of the rotary drum 1. Each of the plurality of cooling metal members 2 has, on the outer surface thereof, a plurality of narrow and deep cooling grooves 13 formed as mentioned later with the longitudinal direction substantially in parallel with the rotating direction of the rotary drum 1. The pair of supporting legs 6 support on the ground surface the bearings 5 holding the both ends of the center axle 3 so as to permit rotation of the rotary drum 1. The center axle 3 is driven by a driving mechanism (not shown), whereby the rotary drum 1 is rotated at a prescribed peripheral speed in the arrow direction in FIG. 1.

Figure 2:
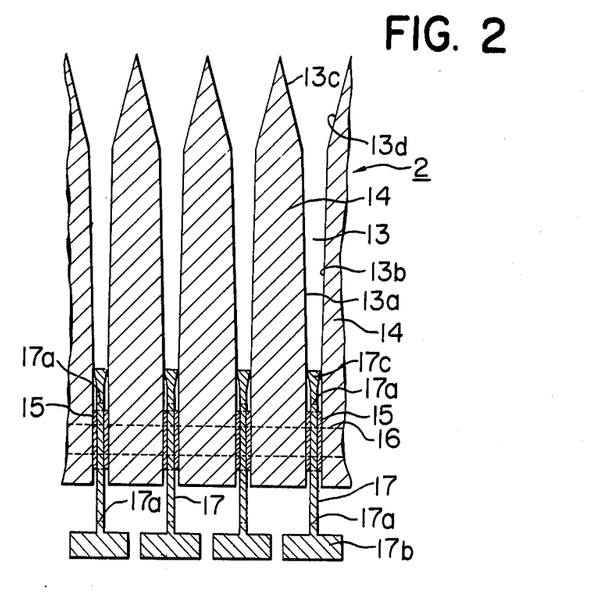
FIG. 2 is a schematic sectional view illustrating an embodiment of the cooling metal member, one of the component parts of the apparatus for manufacturing a vitreous blast furnace slag of the present invention.

The most important features of the apparatus for manufacturing a vitreous blast furnace slag of the present invention lies in the cooling metal members 2 and the plurality of cooling grooves 13 formed on the outer surface thereof as shown in FIG. 2. FIG. 2 is a schematic sectional view illustrating an embodiment of the cooling metal member, one of the component parts of the apparatus for manufacturing a vitreous blast furnace slag of the present invention.

As shown in FIG. 2, the cooling metal member 2 comprises a plurality of rectangular metal plates 14 each with a sharp upper edge. The metal plates 14 should preferably be made of a metal having a high thermal conductivity such as copper, and may also be made of iron or steel. The plurality of metal plates 14 are integrally tightened, with spacers 15 between the individual metal plates 14, at the lower portions thereof, by at least two tightening rods 16 penetrating the metal plates 14 and the spacers 15 at prescribed intervals (these intervals forming the cooling grooves 13), whereby a rectangular cooling metal member 2 having a plurality of cooling grooves 13 on the outer surface thereof is formed.

As shown in FIG. 2, the cooling groove 13 comprises an outwardly flaring inlet section composed of two mutually opposite opening surfaces 13c and 13d having a relatively large inclination angle against the vertical line, for introducing a molten blast furnace slag, and a cooling section gradually narrowing in the depth direction, immediately following said inlet section, composed of two mutually opposite cooling surfaces 13a and 13b having a small inclination angle against the vertical line which follow the two opening surfaces 13c and 13d, for cooling and solidifying the molten blast furnace slag into a vitreous blast furnace slag.

As shown in FIG. 2, the bottom of each of the plurality of cooling grooves 13 having the above-mentioned structure is equipped with a pushing board 17 having an inverse-T shaped cross-section, which comprises a rectangular plate 17c having a length substantially equal to the length of the cooling groove 13 and a stopper 17b serving also as a weight fixed to an end of the plate 17c, in such a manner that the other end of the plate 17c is inserted into the cooling groove 13 and the end fixed with the stopper 17b projects from the inner surface of the cooling metal member 2. The tip portion of the other end of the plate 17c inserted into the cooling groove 13 is made thicker by upsetting and forms the bottom surface of the cooling groove 13. The plate 17c of the pushing board 17 inserted into the cooling groove 13 is provided with a hole 17a larger than the spacer 15 which engages in the hole 17a. The pushing board 17 can therefore slide up and down in the cooling groove 13 along the depth direction of the cooling groove 13 within the range of play between the hole 17a and the spacer 15.

FIG. 2 represents the state of the pushing board 17 when the cooling metal member 2 reaches about the highest position of the barrel of the rotary drum 1, i.e., when the plurality of cooling grooves 13 of the cooling metal member 2 reaches about the position for receiving a molten blast furnace slag (hereinafter referred to as the "positive rotating position"), along with the rotation of the rotary drum 1. Near the positive rotating position, the pushing board 17 is located at the lowest position. More particularly, near the positive rotating position, the pushing board 17 lowers along the depth direction of the cooling groove 13 by the gravity of the stopper 17b and/or a restorer described later, and, stops as the upset end of the plate 17c of the pushing board 17 is pinched by the two mutually opposite cooling surfaces 13a and 13b constituting the cooling section narrowing in the depth direction of the cooling groove 13. In this state, the cooling groove 13 is deepest. On the other hand, when the cooling metal member 2 reaches about the lower position of the barrel of the rotary drum 1, i.e., when the plurality of cooling grooves 13 of the cooling metal member 2 reaches about the discharging position of the blast furnace slag solidified therein (hereinafter referred to as the "reverse rotating position") along with the rotaion of the rotary drum 1, the pushing board 17 is pushed into the cooling groove 13 by a stripper described later until the stopper 17b comes into contact with the inner surface of the cooling metal member 2. In this state, the depth of the cooling groove 13 is smallest.

The cooling section of the cooling groove 13 which is composed of the two mutually opposite cooling surfaces 13a and 13b should preferably have a width of from 3 to 10 mm at the top end thereof, and the cooling section of the cooling groove 13 should preferably have a depth of from 2 to 20 times the above-mentioned width of the top end at the positive rotating position, i.e., when the pushing board 17 is at the lowest position. This is because, with a width of the cooling section of the cooling groove 13 of under 3 mm, it is difficult to satisfactorily pour the molten blast furnace slag into the cooling section of the cooling groove 13, and on the other hand, with a width of said top end of over 10 mm, a higher cooling rate sufficient to substantially completely vitrify the molten blast furnace slag cannot be obtained because of the too large interval between the cooling surfaces 13a and 13b, resulting in partial crystallization of the molten blast furnace slag. With a depth of the cooling section of the cooling groove 13 of under 2 times the width of said top end, the operating efficiency is low because of the too small quantity of treated molten blast furnace slag. With a depth of the cooling section of the cooling groove 13 of over 20 times the width of said top end, on the other hand, it is difficult to satisfactorily take out a cooled and solidified vitreous blast furnace slag from the cooling section of the cooling groove 13. In order to obtain a desired cooling rate, the metal plate 14 should have a thickness, at the position of the top end of the cooling section of the cooling groove 13, of at least 2 times, and preferably at least 3 times the width of the top end of the cooling section.

As shown in FIG. 1, a molten blast furnace slag feeder 7 including a slag container 8 is arranged above the rotary drum 1. The slag container 8 receives a molten blast furnace slag 9 from a blast furnace (not shown) through a feeding trough 10. The molten blast furnace slag 9 received into the slag container 8 is poured into the plurality of cooling grooves 13 of the cooling metal member 2 at the positive rotating position from among the plurality of cooling metal members 2 forming the barrel of the rotating rotary drum 1, through a pouring nozzle 8a provided at the bottom of the slag container 8. The top edge of the slag container 8 is provided with a discharging trough 12 for discharging excess molten blast furnace slag overflowing from the slag container 8 into a dry pit (not shown). A flow rate regulator 11 for adjusting the flow rate of the molten blast furnace slag 9 into the cooling grooves 13 of the cooling metal member 2 from the slag container 8 is installed in the slag container 8 as required. The flow rate regulator 11 may comprise, for example, a fixed plate, substantially horizontally fixed in the slag container 8, of an area equal to the cross-sectional area of the slag container 8, having a plurality of slits, and a shielding plate slightly smaller than the fixed plate, sliding on the fixed plate, having a plurality of slits, in the number equal to that of the slits of the fixed plate. The total opening area of the slits of the fixed plate is increased or decreased by causing the shielding plate to slide on the fixed plate, thereby adjusting the flow rate of the molten blast furnace slag from the slag container 8 into the cooling grooves 13 of the cooling metal member 2.

In FIG. 1, 18 is a stripper equipped with a roller 18a. The stripper 18 is arranged in the rotary drum 1, adjacent to the lower inner surface of the barrel of the rotary drum 1. The stripped 18 is stationarily held at a prescribed position in the barrel of the rotary drum 1 by a support (not shown) such as a boom, from the side not provided with spokes 4 of the rotary drum 1. The roller 18a of the stripper 18 pushes the pushing boards 17, in contact with the stoppers 17b of the pushing boards 17 of the cooling metal member 2 near the reverse rotating position of the rotary drum 1 in rotation, into the cooling grooves 13, until the stoppers 17b come into contact with the inner surface of the cooling metal member 2. As a result, a cooled and solidified vitreous blast furnace slag in the cooling grooves 13 is pushed out from the cooling grooves 13 and discharged.

In FIG. 1, 19 is a cooling tank containing cooling water. The cooling tank 19 is arranged below the rotary drum 1 so that the lower portion of the barrel of the rotary drum 1 is immersed in the cooling water. The plurality of cooling metal members 2 composing the barrel of the rotary drum 1 are successively immersed, along with the rotation of the rotary drum 1, into the cooling water in the cooling tank 19, whereby the cooling metal members 2 heated by the high-temperature molten blast furnace slag poured into the cooling grooves 13 are cooled. For the purpose of conducting cooling of the cooling metal members 2 more effectively, at least one immersion nozzle 20 is installed in the cooling tank 19 as required. The immersion nozzle 20 ejects cooling water, under the surface of water, onto the surfaces of the cooling metal members 2, along the longitudinal direction of the cooling grooves 13 of the cooling metal member 2 immersed into the cooling water in the cooling tank 19.

In FIG. 1, 21 is a restorer of the pushing board 17. The restorer 21 is arranged in the rotary drum 1 above the exit side of the cooling tank 19 relative to the rotating direction of the rotary drum 1 and adjacent to the inner surface of the barrel of the rotary drum 1. The restorer 21 is stationarily held at a prescribed position in the barrel of the rotary drum 1 by a support (not shown) such as a boom from the side not provided with spokes 4 of the rotary drum 1. The restorer 21 pulls out the pushing board 17 which has been pushed into the cooling grooves 13 by the stripper 18 to the lowest position, i.e., the receiving position of molten blast furnace slag. The restorer 21 comprises, for example, a magnet, and pulls out the pushing board 17 under the effect of magnetism of the magnet to the lowest position. In this case, therefore, the stopper 17b of the pushing board 17 should be made of a magnetizable material such as steel. When the stopper 17b is made of a non-magnetizable material such as silicon carbide, the restorer 21 may be made so as to mechanically pull out the pushing board 17. Although only one restorer 21 may be installed, it is desirable to arrange at least two restorers as shown in FIG. 1 from safety considerations, because insufficient withdrawal of the pushing board 17, if any, may be dangerous.

A vitreous blast furnace slag is manufactured as follows by the apparatus for manufacturing a vitreous blast furnace slag of the present invention having the structure as mentioned above. More specifically, as shown in FIG. 1, a molten blast furnace slag 9 in the slag container 8 of the molten blast furnace slag feeder 7 is poured through the pouring nozzle 8a into the plurality of cooling grooves 13 of the cooling metal member 2 reaching near the highest position of the barrel of the rotary drum 1 rotating in the arrow direction in the drawing (i.e., near the position for receiving molten blast furnace slag), and cooled and solidified at a high cooling rate by the two mutually opposite cooling surfaces 13a and 13b composing the cooling section of the cooling grooves 13 into a substantially completely vitrified blast furnace slag.

Then, along with the rotation of the rotary drum 1, when the cooling metal member 2 filled with the vitreous blast furnace slag reaches near the lowest position of the barrel of the rotary drum 1, the pushing boards 17 of the cooling metal member 2 is pushed into the cooling grooves 13 by the stripper 18, and thus the cooled and solidified vitreous blast furnace slag in the cooling grooves 13 is pushed out from the cooling grooves 13 in granular or sheet shape, falling into the cooling water in the cooling tank 19. The cooling metal member 2 heated by the high-temperature blast furnace slag is, on the other hand, cooled by the cooling water in the cooling tank 19. The temperature of the cooling water in the cooling tank 19 is increased substantially to the boiling point under the effect of heat exchange with the cooling metal members 2 and the vitreous blast furnace slag, and furthermore, the vitreous blast furnace slag has still a high temperature. Therefore, when the vitreous blast furnace slag having fallen into the cooling water in the cooling tank 19 is taken out by an appropriate means, water deposited on the surface of the vitreous blast furnace slag is immediately evaporated. In addition, since the molten blast furnace slag is rapidly cooled in a state in which expansion thereof is restricted by the two mutually opposited cooling surfaces 13a and 13b composing the cooling section of the cooling grooves 13 in the present invention, the vitreous blast furnace slag obtained has a very low porosity and a large internal strain. The vitreous blast furnace slag obtained is therefore substantially free of water and excellent in fine-pulverability.

When using the cooling metal members 2 of the present invention, the molten blast furnace slag is substantially completely vitrified by the stay in the cooling grooves 13 for about 3 to about 7 seconds from the beginning of pouring into the cooling grooves 13. The size and the peripheral speed of the rotary drum 1 are therefore decided so as to give a staying time within the above-mentioned range.

As shown by the chain line in FIG. 1, the stripper 18 may be installed in the rotary drum 1 above the inlet side of the cooling tank 19 relative to the rotating direction of the rotary drum 1 and adjacent to the inner surface of the barrel of the rotary drum 1, and the vitreous blast furnace slag cooled and solidified in the cooling grooves 13 of the cooling metal members 2 may be caused to fall onto a guide plate 22 instead of falling into the cooling tank 19 to take out therefrom.

As mentioned above, when the cooling metal members 2 having become empty after discharge of the vitreous blast furnace slag and cooled by the cooling water in the cooling tank 19 reaches the position where the restorer 21 is installed along with the rotation of the rotary drum 1, the pushing boards 17 of the cooling metal member 2 are withdrawn by the restorer 21 to the lowest position, i.e., to the position for receiving molten blast furnace slag. When the cooling metal member 2 reaches again near the highest point of the barrel of the rotary drum 1 along with the rotation of the rotary drum 1, a molten blast furnace slag is poured into the cooling grooves 13 of the cooling metal member 2 as mentioned above, and thus, manufacture of the vitreous blast furnace slag is continuously carried out.

Figure 3:
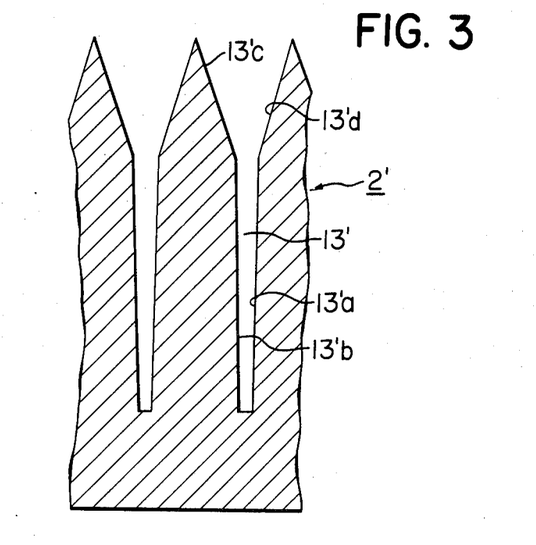
FIG. 3 is a schematic sectional view illustrating another embodiment of the cooling metal member, one of the component parts of the apparatus for manufacturing a vitreous blast furnace slag of the present invention.

The cooling metal member 2 described above with reference to FIG. 2 may be replaced by another cooling metal member 2' shown by the schematic sectional view of FIG. 3. The cooling metal member 2' shown in FIG. 3 comprises a single rectangular metal plate which is provided, on the outer surface thereof by casting or by machining, with a plurality of cooling grooves 13' comprising an inlet section and a cooling section having the same dimensions as the cooling grooves 13 comprising the inlet section and the cooling section described above in detail with reference to FIG. 2. More particularly, the cooling grooves 13' comprises an outwardly flaring inlet section composed of two mutually opposite opening surfaces 13'c and 13'd having a relatively large inclination angle against the vertical line, for introducing a molten blast furnace slag, and a cooling section gradually narrowing in the depth direction, immediately following said inlet section, composed of two mutually opposite cooling surfaces 13'a and 13'b having a small inclination angle against the vertical line which follow the two opening surfaces 13'c and 13'd, for cooling and solidifying the molten blast furnace slag into a vitreous blast furnace slag. As mentioned above, the bottom surface of each of the cooling grooves 13 of the cooling metal member 2 described with reference to FIG. 2 is formed by the upset end of the pushing board 17, whereas the cooling metal member 2' shown in FIG. 3 has not a special component part such as a pushing board 17, and the bottom surface of the cooling groove 13' is formed with metal plates alone.

Therefore, when using the cooling metal member 2' shown in FIG. 3, the stripper 18 having the structure as mentioned above is replaced by a stripper 18 comprising a vibrator, and vibrations are applied to the cooling metal member 2' from the back or the side thereof, thereby causing the vitreous blast furnace slag cooled and solidified in the cooling grooves 13' to fall from the cooling grooves 13'. When using the cooling metal member 2' shown in FIG. 3, it is needless to mention that a restorer 21 is not necessary.

Now, the apparatus for manufacturing a vitreous blast furnace slag of the present invention is described more in detail by means of an example.

EXAMPLE

A rotary drum 1 was prepared, which has a barrel with a circumference of 4 m formed by endlessly connecting cooling metal members 2 made of copper of a thickness of 100 mm having a structure as described above with reference to FIG. 2. The outer surface of each of the cooling metal members 2 was provided with 50 cooling grooves 13 each comprising an inlet section and a cooling section with the longitudinal direction in parallel with the rotating direction of the rotary drum 1. The top end of the cooling section of the cooling groove 13 has a width of 5 mm; the bottom surface of the cooling section when the pushing board 17 was at the lowest position had a width of 4 mm; and the cooling section had a depth of 50 mm when the pushing board 17 was at the lowest position. The cooling section of the cooling groove 13 had therefore a cross-sectional area of 2.25 cm$^2$ ((5 mm+4 mm)×50 mm÷2=2.25 cm$^2$). Each of metal plates 14 composing the cooling metal member 2 had a thickness of 15 mm at the top position of the cooling section of the cooling groove 13.

Then, molten blast furnace slag 9 in the slag container 8 of the molten blast furnace slag feeder 7 was poured through the pouring nozzle 8a into the cooling grooves 13 of the cooling metal member 2 at the highest position of the barrel of the rotary drum 1, i.e., at the receiving position of molten blast furnace slag, while rotating the rotary drum 1 at a peripheral speed of 0.4 m per second (i.e., one turn in 10 seconds) so that the cooling section was substantially filled with the poured molten blast furnace slag. The poured molten blast furnace slag was rapidly cooled at a high cooling rate by the two mutually opposite cooling surfaces 13a and 13b composing the cooling section of the cooling groove 13 into a substantially completely vitrified blast furnace slag. Then, when the cooling metal member 2 filled with the vitreous blast furnace slag came into cooling water in the cooling tank 19 along with the rotation of the rotary drum 1, the pushing boards 17 of the cooling metal member 2 were pressed by the stripper 18 into the cooling grooves 13, whereby the vitreous blast furnace slag cooled and solidified in the cooling grooves 13 was pushed out from the cooling grooves 13 and fell into the cooling water in the cooling tank 19. When the vitreous blast furnace slag having fallen into the cooling water in the cooling tank 19 was taken out by an appropriate means from the cooling tank 19, water deposited on the surface of the vitreous blast furnace slag immediately dried spontaneously, and thus, a vitreous blast furnace slag substantially free of water was obtained.

On the other hand, when the empty cooling metal member 2 cooled by the cooling water in the cooling tank 19 reaches the installation position of the restorer 21 along with the rotation of the rotary drum 1, the pushing boards 17 of the cooling metal member 2 were withdrawn by the restorer 21 to the lowest position, i.e., to the receiving position of molten blast furnace slag, and thus, the cooling metal member 2 returned to the state of receiving the next batch of molten blast furnace slag.

The vitreous blast furnace slag obtained by the apparatus of the present invention as mentioned above (hereinafter simple referred to as the "slag of the present invention") and a dried water-granulated blast furnace slag obtained by a conventional manufacturing process (hereinafter simple referred to as the "conventional water-granualated slag") were individually subjected to a rough grinding and removal of iron, and adjusted to the particle size distribution shown in Table 1.

TABLE 1

| Particle size (mm) | Size distribution (wt. %) |
|---|---|
| From 2.5 to under 4 | 2 |
| From 1.2 to under 2.5 | 26 |
| From 0.6 to under 1.2 | 43 |

TABLE 1-continued

| Particle size (mm) | Size distribution (wt. %) |
|---|---|
| From 0.3 to under 0.6 | 22 |
| From 0.15 to under 0.3 | 5 |
| Under 0.15 | 2 |

A grinding test was carried out on specimens each weighing 2.5 kg sampled respectively from the slag of the present invention and the conventional water-granulated slag, the size distribution of which was adjusted as shown in Table 1. The grinding test was conducted, with the use of a ball mill used for the test of grinding work index specified in JIS (abbreviation of the Japanese Industrial Standards) M4002-1976, by measuring the grinding time required until the Blaine fineness based on the Blaine-air-permeability method reached 4,200 cm$^2$/g for each of the specimens. In this grinding test, diethylene glycol was added as the grinding assistant in an amount of 0.05 wt.% relative to the specimen weight.

The grinding time measured in the aforementioned grinding test was as follows:

Specimens of the slag of the present invention: 200 minutes;

Specimens of the conventional water-granulated slag: 220 minutes

This clarified that the fine-pulverability expressed in the grinding time is higher by about 10% in the slag of the present invention than the conventional water-granulated slag.

Figure 4:
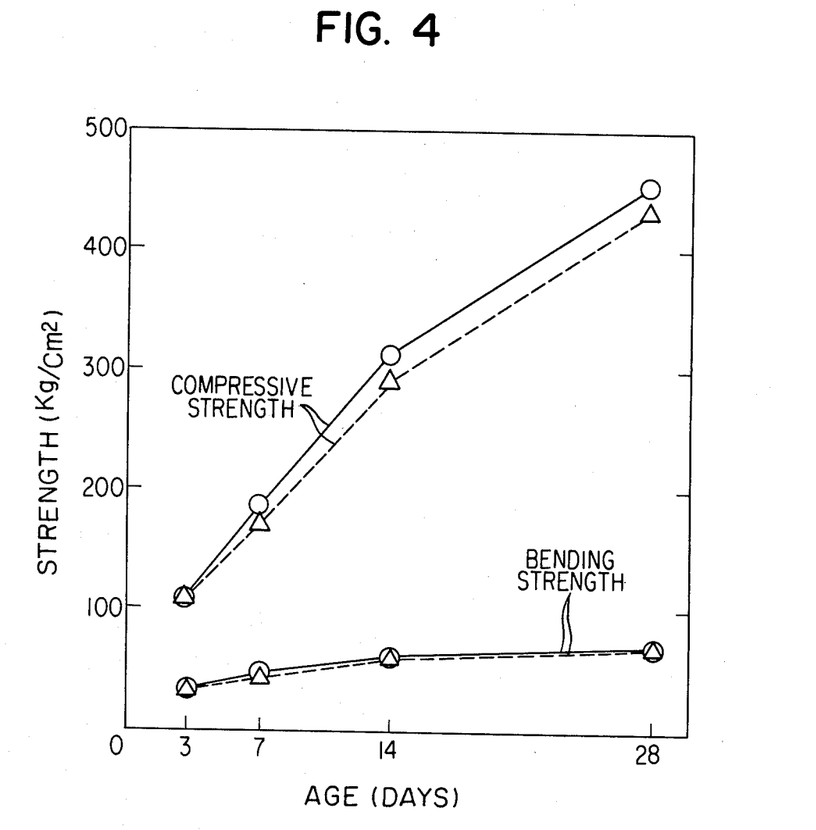
FIG. 4 is a graph illustrating test results of the strength of test specimens of mortar of a blast furnace cement prepared from a vitreous blast furnace slag manufactured by the apparatus for manufacturing a vitreous blast furnace slag of the present invention.

Then, 40 weight parts of the slag of the present invention finely pulverized to a Blaine fineness of 4,200 cm$^2$/g were mixed with 60 weight parts of ordinary Portland cement, and a blast furnace cement specified in JIS R5211-1977 was prepared by adding gypsum so as to give an SO$_3$ content in the product blast furnace cement of 2.0 wt.%. From this blast furnace cement, mortar specimens for the strength test specified in JIS R5201-1977 were prepared. For comparison purposes, on the other hand, another mortar specimens were prepared under the same conditions as those mentioned above except that the conventional water-granulated slag finely pulverized to the same Blaine fineness (4,200 cm$^2$/g) was used in place of the slag of the present invention. Compressive strength and bending strength were measured for each of the respective mortar specimens at ages of 3, 7, 14 and 28 days. The results of this measurement are shown in FIG. 4. In FIG. 4, the solid line connecting the plots "O" represents the mortar specimens prepared with the slag of the present invention, and the dotted line connecting the plots "Δ" represents the mortar specimens prepared with the conventional water-granulated slag.

As is evident from FIG. 4, compressive strength and bending strength of the mortar of the blast furnace cement manufactured with the slag of the present invention show almost no difference as compared with those of the mortar of the blast furnace cement manufactured with the conventional water-granulated slag, indicating that there is no remarkable difference in hydraulicity between the two slags.

Then, with the use of mixtures made by adding respectively 5 and 10 wt.% of the slag of the present invention finely pulverized to a Blaine fineness of 4,000 cm$^2$/g to ordinary Portland cement, two kinds of mortar specimens were prepared for the strength test specified in JIS R5201-1977.

For comparison purposes, on the other hand, another two kinds of mortar specimens were prepared under the same conditions as those mentioned above except that the conventional water-granulated slag finely pulverized to the same Blaine fineness (4,000 cm²/G) was employed in place of the slag of the present invention. Compressive strength was measured on each of the two kinds of mortar specimens at ages of 3, 7 and 28 days. The results of this measurement are given in Table 2. Table 2 shows the results of this measurement in terms of compressive strength ratio with compressive strength at a mixing ratio of the slag of the present invention and the conventional water-granulated slag of 0 wt.% as 100.

TABLE 2

| | Mixing ratio (wt. %) | Compressive strength ratio | | |
| --- | --- | --- | --- | --- |
| | | at 3 days | at 7 days | at 28 days |
| Slag of the present invention | 5 | 102 | 94 | 98 |
| | 10 | 100 | 95 | 100 |
| Conventional water-granulated slag | 5 | 99 | 88 | 97 |
| | 10 | 98 | 89 | 98 |

As is clear from Table 2, compressive strength in the case where the slag of the present invention was added to ordinary Portland cement shows almost no difference from that in the case where the conventional water-granulated slag was added to ordinary Portland cement, indicating that there is no remarkable difference in hydraulicity between the two mixtures.

Then, 150 ml of N/2 aqueous hydrochloric acid solution and 150 ml of 2% aqueous citric acid solution were respectively added to 1g of the slag of the present invention having a particle size of up to 250 $\mu$m and 1g of the conventional water-granulated slag having a particle size of up to 250 $\mu$m. After shaking by rotation at a temperature of 20° C. for 60 minutes, these solutions were rapidly filtered, and the resultant residues were rinsed and dried to measure the solubility of $SiO_2$, $CaO$ and $MgO$. The results of this measurement are shown in Table 3. In Table 3, "T" represents the total quantity of each constituent; "S" represents the dissolved quantity of each constituent into the N/2 aqueous hydrochloric acid solution; and "C" indicates the dissolved quantity of each constituent into the 2% aqueous citric acid solution.

TABLE 3

| | Solubility | |
| --- | --- | --- |
| | Slag of the present invention | Conventional water-granulated slag |
| S . $SiO_2$/T . $SiO_2$ | 93.5% | 89.8% |
| S . $CaO$/T . $CaO$ | 99.3% | 100.0% |
| S . $MgO$/T . $MgO$ | 95.1% | 98.7% |
| C . $MgO$/T . $MgO$ | 80.0% | 96.7% |

As is evident from Table 3, the slag of the present invention has a higher solubility of $SiO_2$ constituent into N/2 aqueous hydrochloric acid solution as compared with the conventional water-granulated slag, indicating that the slag of the present invention has an excellent quality as a raw material for a calcium silicate fertilizer.

As described above in detail, the apparatus for manufacturing a vitreous blast furnace slag of the present invention can give a high cooling rate sufficient to substantially completely vitrify a molten blast furnace slag, and moreover, the molten blast furnace slag is rapidly cooled, not coming into direct contact with cooling water, in a state in which expansion thereof is restricted. According to the apparatus for manufacturing a vitreous blast furnace slag of the present invention, therefore, it is possible to manufacture a vitreous blast furnace slag having the following excellent properties, thus providing industrially useful effects:

(1) The product vitreous blast furnace slag is substantially completely vitrified;

(2) It is substantially free of water because of the very low porosity, this not only reducing transportation cost, but also eliminating the necessity of drying costs;

(3) It is excellent in fine-pulverability because of the large internal strain, this minimizing time and labor required for fine grinding; and (4) It has a high quality as a raw material for a cement or a calcium silicate fertilizer.

What is claimed is:

1. An apparatus for manufacturing a vitreous blast furnace slag, which comprises:

a rotary drum having a center axle, and a substantially circular barrel which comprises a plurality of rectangular cooling metal members endlessly connected together, each of said plurality of cooling metal members having a plurality of narrow and deep cooling grooves on the outer surface thereof with the longitudinal direction of said cooling grooves being substantially in parallel with the rotating direction of said rotary drum, and each of said plurality of cooling grooves comprising an outwardly flaring inlet section for receiving a molten blast furnace slag and an inwardly narrowing cooling section following said inlet section, for rapidly cooling and solidifying the molten blast furnace slag into a vitreous blast furnace slag;

a driving mechanism connected to the center axle of said rotary drum for rotating said rotary drum;

a molten blast furnace slag feeder including a slag container, arranged above said rotary drum, said molten blast furnace slag feeder being adapted to receive a molten blast furnace slag discharged from a blast furnace into said slag container to to pour said molten blast furnace slag thus received into said plurality of cooling grooves of said cooling metal members at about the highest position of the barrel of said rotary drum during rotation of said rotary drum;

a stripper stationarily arranged at a prescribed position in said rotary drum adjacent to the inner surface of the barrel of said rotary drum, said stripper being adapted to take out a cooled and solidified vitreous blast furnace slag in said plurality of cooling grooves of said cooling metal member; and a cooling tank containing cooling water, arranged below said rotary drum so that the lower portion of the barrel of said rotary drum is immersed in the cooling water, said cooling tank being arranged and adapted to cause said plurality of cooling metal members forming the barrel of said rotary drum to successively pass through the cooling water in said cooling tank during rotation of said rotary drum, thereby cooling said cooling metal members heated by the high-temperature molten blast furnace slag poured into said cooling grooves.

2. The apparatus as claimed in claim 1, wherein:

the top end of said cooling section of each of said cooling grooves has a width in the range of from 3 to 10 mm, and said cooling section of each of said cooling grooves has a depth in the range of from 2 to 20 times the width of said top end.

3. The apparatus as claimed in claim 1 or 2, wherein: each of said plurality of cooling metal members comprises a plurality of rectangular metal plates, each metal plate having a sharp upper edge, and said plurality of metal plates are integrally tightened, with spacers between individual metal plates, at the lower portion thereof, by at least two tightening rods penetrating said metal plates and said spacers, at prescribed intervals, thereby forming said cooling metal members having said plurality of cooling grooves corresponding to said prescribed intervals; and wherein, the bottom of each of said plurality of cooling grooves is provided with a pushing board comprising a rectangular plate having substantially the same length as said cooling groove and a stopper fixed to an end of said plate in such a manner that the other end of said plate is inserted into said cooling groove and the end fixed with said stopper projects from the inner surface of said cooling metal member, and that said pushing board is slidable in the depth direction of said cooling groove, whereby the tip of said other end of said plate inserted into said cooling groove forms the bottom surface of said cooling groove.

4. The apparatus as claimed in claim 1 or 2, wherein: each of said plurality of cooling metal members comprises a single rectangular metal plate, and the outer surface of said single metal plate is provided with said plurality of cooling grooves.

5. The apparatus as claimed in claim 3, wherein said stripper comprises a roller.

6. The apparatus as claimed in claim 4, wherein said stripper comprises a vibrator.

7. The apparatus as claimed in claim 3, comprising: a restorer stationarily arranged at a prescribed position in said rotary drum, above the exit side of said cooling tank relative to the rotating direction of said rotary drum and adjacent to the inner surface of the barrel of said rotary drum, said restorer being adapted to withdraw said pushing boards to the lowest position.

* * * * *

UNITED STATES PATENT AND TRADEMARK OFFICE
CERTIFICATE OF CORRECTION

PATENT NO.  :   4,289,462

DATED       :   September 15, 1981

INVENTOR(S) :   Ryo ANDO et al

It is certified that error appears in the above—identified patent and that said Letters Patent is hereby corrected as shown below:

Column 14 (claim 1), line 42, change "to to" to --and to--.

*Signed and Sealed this*

*Twenty-sixth* Day of *January 1982*

[SEAL]

Attest:

GERALD J. MOSSINGHOFF

*Attesting Officer*   *Commissioner of Patents and Trademarks*